May 22, 1928. 1,671,087
A. CARLSON
AUTOMOBILE BODY
Filed Oct. 30, 1924 2 Sheets-Sheet 1
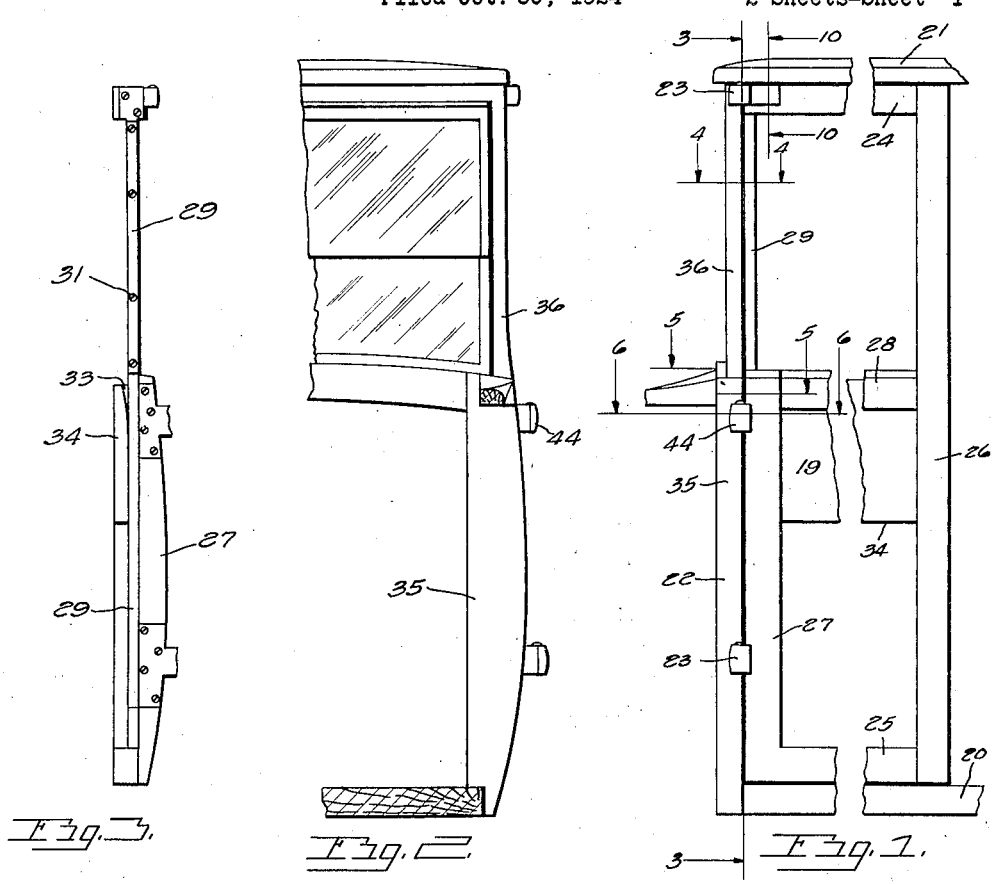
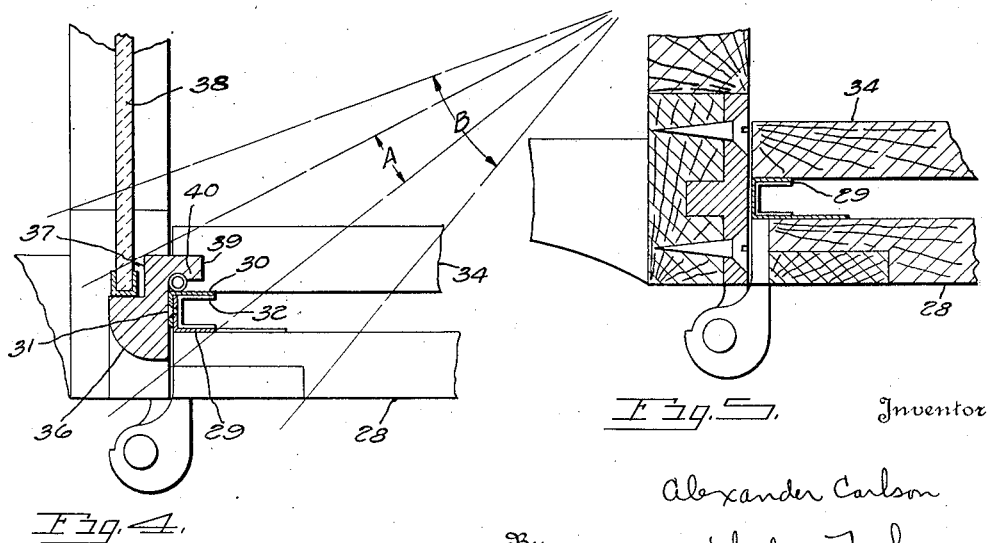
Inventor
Alexander Carlson
By Maréchal + Fehr
Attorney

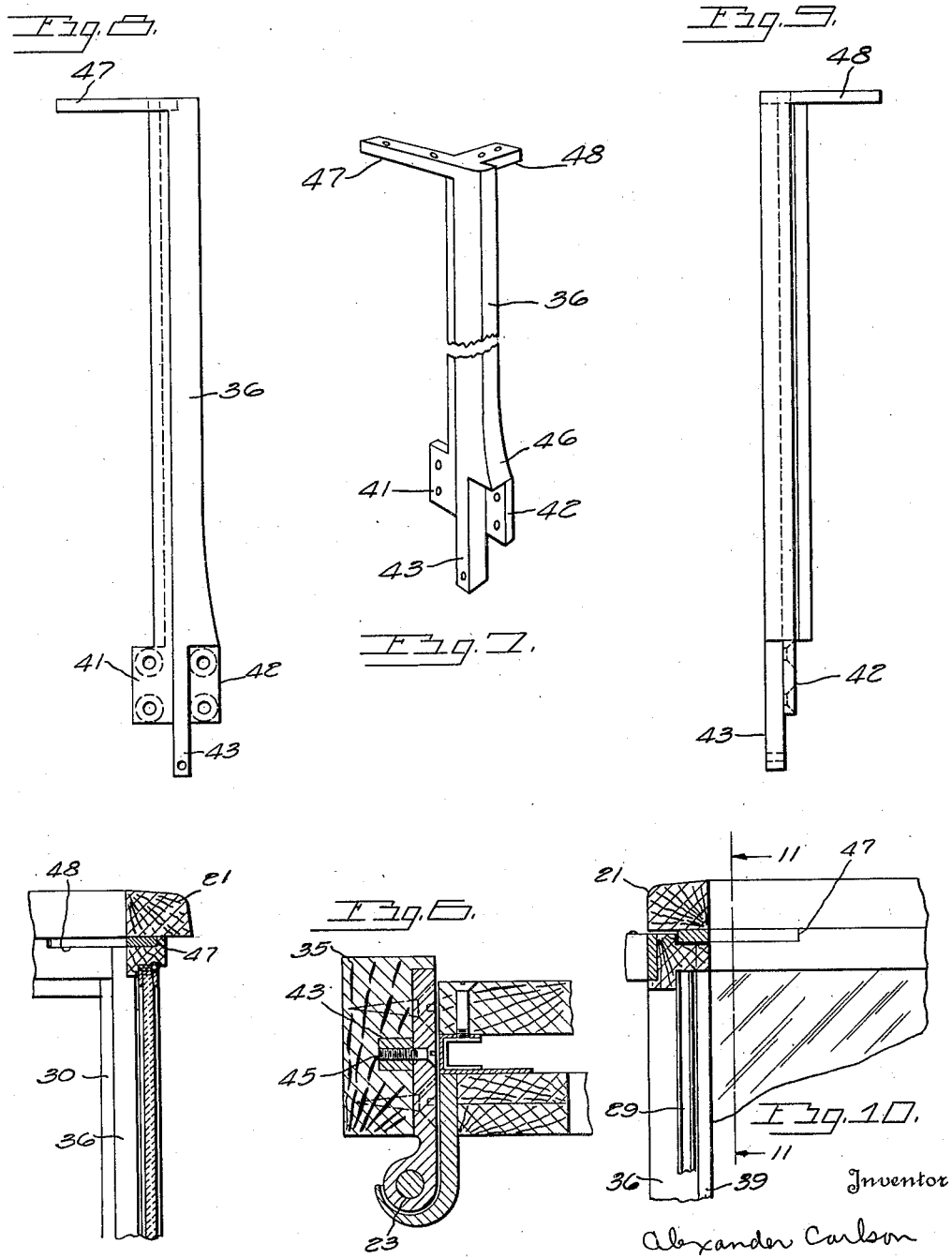

Patented May 22, 1928.

1,671,087

UNITED STATES PATENT OFFICE.

ALEXANDER CARLSON, OF PIQUA, OHIO.

AUTOMOBILE BODY.

Application filed October 30, 1924. Serial No. 746,882.

This invention relates to the construction of automobile bodies and particularly automobile bodies of the closed car type.

One of the principal objects of the present invention is to provide an automobile body for closed cars in which the front pillar and door construction is such as to reduce to a minimum what may be termed the blind angle, that is, the angle in which it is impossible to see approaching objects from the driver's seat.

Other and further objects of the invention will be apparent from the following description taken in connection with the accompanying drawings, in which:

Fig. 1 is a side elevation of the forward part of an automobile body construction embodying the present invention;

Fig. 2 is a front elevation of the same;
Fig. 3 is an elevation taken on the line 3—3 of Fig. 1 showing one edge of the door construction;

Figs. 4, 5, and 6 are sectional views taken respectively on the lines 4—4, 5—5, and 6—6 of Fig. 1;

Fig. 7 is a perspective view of the upper section of the front pillar;

Figs. 8 and 9 are respectively front and side elevations of the upper section of the pillar;

Fig. 10 is a vertical section taken on the line 10—10 of Fig. 1; and

Fig. 11 is a vertical section taken on the line 11—11 of Fig. 10.

Referring to the drawings 20 represents the floor of the body and 21 represents the roof portion thereof which is supported from the floor by means of a number of pillars of which one is shown at 22. The drawings illustrate the application of the present invention to the left front pillar and door construction of an automobile body, but it should be understood that the invention may be and preferably is also embodied in the right front pillar and door construction. It is the front pillars and doors that ordinarily constitute an annoyance and a menace to the safety of the occupants owing to the inability of the driver to see approaching objects which are hidden from his view by the pillars and doors.

Suitably hinged to the pillar 22 by hinges 23 is a door 19 having top and bottom horizontally disposed frame members 24 and 25 respectively which are connected at their rearward ends by an upright door post 26 which may be of the usual heavy or large section construction.

The forward door post which is adapted to abut the pillar 22 consists of a lower door post section 27, which may be of heavy wooden construction, extending upwardly from the bottom frame member 25 to the top of the door panel where it is connected by means of a belt rail 28 with the other door post 26. The lower door post section 27 is connected with the top frame member 24 by means of an upper door post section 29 consisting of a U-shaped thin-walled channel member, formed or cast of iron or other suitable material, the upper end of which is flanged out and rigidly secured to the top frame member 24 and the lower end of which is secured to the inner face of the lower door post section 27. The construction and arrangement of the channel door post section is best illustrated in Figs. 3, 4, 5, and 6, from which it will be seen that the bottom wall of the U-shaped channel member lies in the edge of the door frame and forms part of the surface or edge thereof which abuts the pillar. One arm of the U-shaped channel member is preferably extended as shown in Fig. 5 to afford a convenient means for securing the same to the lower door post section 27.

The rearward door post 26, the forward door post section 29, the top frame member 24, and the belt rail 28 constitute a window frame or opening which is adapted to receive a window pane slidably mounted in the door. The channel member 29 is adapted to receive one edge of the window pane (not shown) and extends well down into the lower or panel section of the door to form a guide for the window pane as it is slid upwardly or downwardly in the door. To permit ready removal of the window pane one side of the channel member forming the window frame is made removable as indicated at 30 in Fig. 4, the removable portion being secured to the main portion of the channel by means of screws or other suitable fastening devices 31.

From the foregoing it is apparent that the outline or outside dimensions of the upper portion of the door post which abuts the pillar 22 is no greater than the extreme dimensions of the channel member 29 as shown in Fig. 4. By attaching the top hinge 23 of the door to the top frame member 24 of the door as shown in Figs. 1 and 10 the same is brought out of the way of the glass sliding in channel 29, yet the rear hinge leaf may lie rearwardly of the web of the channel and the said web may be close to the post (herein directly at the door joint) without need of providing space to receive such leaf, and a minimum dimension for the upper portion of the post is thus provided for. The channel member may, if it is desired, be provided with an inner lining member or so-called glass runner 32 for cushioning the same and protecting the window pane, which is usually of plate glass, against scratching, scraping and rattling. Removal of the window pane from the door may be effected by simply removing the removable portion 30 of channel member 29 and a corresponding part of the guide or channel (not shown) which is secured to the rearward door post 26 and then guiding the upper end of the window pane inwardly and upwardly, or to the left as shown in Fig. 3, until the window pane is entirely free of its guiding or channel members. To permit this lateral or inward movement of the window pane with respect to the lower portion of channel member 29 the latter is flared outwardly as at 33 to provide a wide mouth. On the inner side of the door is a lock board 34 which at one end is secured to the rearward door post 26 and at the other end lies against and is secured to the channel member 29.

The pillar 22 consists of a lower pillar section 35 and an upper pillar section 36 in extension of the lower pillar section, said pillar sections being rigidly secured together to form a rigid pillar to support the roof of the car and to form part of the frame work which is adapted to receive the door 24. The lower pillar section 35 extends upwardly to the belt rail or line of sight dividing the lower or solid portion of the body from the upper or windowed portion thereof, and may be formed out of wood or similar material and may be of the usual large section rigid construction. The upper pillar section 36 which traverses the upper or windowed portion of the body is made as small in size as possible in order to offer the least obstruction to the vision of the driver and may be formed of brass or other suitable material.

Referring to Fig. 4 it will be seen that the upper pillar section 36 is substantially Z-shaped in cross section, one arm extending forwardly from the outer edge of the pillar to provide a rabbet or recess 37 for the reception of the windshield 38. The other arm 39 of the pillar extends rearwardly from the inner edge thereof to form with the main body of the pillar a rabbet or recess 40 to receive the upper door post section or channel 29. Still referring to Fig. 4 it will be seen that not only is the upper pillar section 36 small as compared with the lower pillar section, but the material thereof is so disposed as to give great rigidity and lateral strength to the upper pillar section. It is arranged to receive the channel door post 29 between the rearwardly extending arm or flange 39 and the outer edge of the pillar. A suitable sealing means or gasket may be interposed between the channel member 29 and the flange 39 if desired.

For securing the upper pillar section 36 in place, it is provided with a flanged portion constituting a downward continuation of the transverse web or body of the Z section, said extension having laterally extending flanges 41 and 42 which are adapted to be set into the lower pillar section 35, the rear surface of the flanges lying flush with the rear surface of the lower pillar section 35, such flanges being provided with suitable holes to receive fastening screws. Projecting forwardly from said flanges and in extension of the forwardly extending arm or flange of the upper pillar section is a tongue 43 which is also set into a recess in the lower pillar section, said tongue being extended downwardly below the flanges 41 and 42 to a position behind one of the door hinges 23. This construction is best illustrated in Figs. 6 to 9 from which it will be seen that the hinge 23 overlies the tongue 43 which is embedded in the lower pillar section 35, and since the hinge is rigidly secured to the pillar the tongue 43 is held immovable in the lower pillar section. To prevent the tongue 43 from working loose in the lower pillar section and to further secure the upper pillar section against movement with respect to the lower pillar section the tongue 43 is preferably fastened directly to door hinge 23 by the screw means 45. As seen from Fig. 7, the tongue 43 is smaller than the flange portion 36 of which it forms a continuation and the latter therefore seats on the frame member 22 above the point of attachment thereto of the web portion 41, 42 and receives an underriding support therefrom. This portion of the pillar 36 is preferably curved or tapered outwardly at 46 to connect with the outer edge of the lower pillar section which lies in the outer surface of the lower or solid part of the automobile body and is reinforced and tied to the web at 41, 42 by the rib 43.

The upper pillar section 36 is provided at its upper end with horizontally disposed arms by which it may be secured in position one of which arms 47 extends laterally toward the middle of the car and the other of which 48 extends rearwardly from the pillar. As best shown in Figs. 10 and 11 these horizontally extending arms are set into the respective portions of the automobile body preferably with the upper surfaces of the arms flush with the frame work of the body, so as to present a smooth top upon which the roof portion 21 may be set and secured in place.

From the foregoing it will be apparent that the present invention provides a strong, simple and rigid front pillar and door post construction which has the advantage of offering very little obstruction to the vision of the driver, that is to say, it provides a construction having a small blind angle. The channel member 29 is of very small yet rigid construction and functions both as a door post and as a channel for the window pane. The upper pillar section is also of extremely small but rigid and substantial construction, and because of its Z-shape it provides rabbets for compactly receiving the windshield frame and the door post channel, the blind angle formed by the said assembled parts being but slightly greater than the blind angle caused by the pillar alone. Referring to Fig. 4 the blind angle of a device constructed in accordance with the present invention is indicated by the letter A, this representing a large reduction from the blind angle B of known constructions in which the heavy pillar section 35 is extended to the roof of the car and in which the door post 27 is of uniformly heavy construction from the bottom to the top of the door. It is to be noted that an important feature of the present invention, contributing to the reduction of the blind angle, is the elimination of all that part of the door post which is commonly found between the channel 29 and the pillar 22, so that the channel comes directly into contact with the pillar. The door post at this point has its exterior dimensions reduced to those of the channel member, and it is to be noted that the angular width of the pillar, as viewed in Fig. 4, has been reduced to such an extent that it is not more than twice the effective angular width of the door post, which as already pointed out, has itself been reduced to an extraordinary degree.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a door construction for automobile bodies, upright door posts spaced apart to provide a window opening therebetween, horizontal frame members connecting the door posts, and a window pane mounted to slide vertically in said door to close the window opening, one of said door posts consisting of a metallic channel member of extreme thinness in the plane of the window pane fitting closely about one edge of the window pane and adapted to guide the sliding movement thereof and one side of the channel member being removable to permit the removal of the window pane laterally, the door structure being formed to permit such ready removal.

2. An automobile body door having a window opening in the upper part thereof, comprising, top and bottom horizontally disposed frame members, a door post connecting said top and bottom members, said door post having a lower post member secured to said bottom member, an upper post member secured to said top frame member and to the inner surface of the lower post member, a belt rail secured to the upper portion of the lower post member and extending laterally therefrom, a lock board secured to the inner surface of the upper post member and extending laterally therefrom in spaced relationship with the belt rail, and a window pane slidably mounted between the belt rail and lock board, said upper post member consisting of a thin-walled rigid channel the groove of which receives one edge of the window pane to guide the sliding movement thereof.

3. In an automobile body, a floor, a roof, a pillar for supporting the roof from the floor, said pillar having a lower section and an upper section, said upper section having an elongated narrow metallic body portion, a laterally spreading flanged portion at the lower end thereof for securing to said lower section, and a rib formed on the flanged portion in prolongation of said body portion, said rib extending below said flanged portion and adapted to lie underneath a hinge set into said lower pillar section.

4. In an automobile body, a floor, a roof, a pillar for supporting the roof from the floor, said pillar having a lower section and an upper section, said upper section having an elongated narrow metallic body portion, means at the lower end of said body portion for securing the same to said lower section, said means including a tongue projecting downwardly from said body portion and adapted to lie underneath a door hinge set into said lower pillar section.

5. In an automobile body, a floor, a roof, a pillar for supporting the roof from the floor, said pillar having a lower section and an upper section, said upper section having an elongated narrow metallic body portion, means at the lower end of said body portion for securing the same to said lower section, said means including a tongue projecting downwardly from said body portion and adapted to lie underneath a door hinge set into said lower pillar section and means for securing said tongue to said hinge.

6. An automobile body door having a window pane in the upper part thereof, comprising, top and bottom horizontally disposed frame members, a door post connecting said top and bottom members, said door post having a lower post member secured to said bottom member and an upper post member secured to said top frame member and to the lower post member, a belt rail extending laterally from the upper portion of the lower post member, a lock board secured to the inner part of the upper post member and rigidly held thereby in spaced relationship with the belt rail, and a window pane slidably mounted between the belt rail and the lock board, said upper post member comprising a thin-walled rigid channel the groove of which receives one edge of the window pane to guide the sliding movement thereof.

7. In an automobile body, a floor, a roof, a pillar for supporting the roof from the floor, said pillar having a lower section and an upper section, said upper section having an elongated narrow metallic body portion and means at the lower end thereof for securing to said lower portion, said means comprising a rib in prolongation of said body portion, said rib being adapted to lie underneath a hinge set into said lower pillar section.

8. In a door construction for automobile bodies, upright door posts spaced apart to provide a window opening therebetween, horizontal frame members connecting the door posts, and a window pane mounted to slide vertically in said door to close the window opening, one of said door posts consisting of a metallic channel member of extreme thinness in the plane of the window pane fitting closely about one edge of the window pane and adapted to guide the sliding movement thereof and one side of the channel member being removable to permit the removal of the window pane laterally, means for normally holding said removable channel member in position and readily accessible for removal when the door is in open position.

9. In a closed automobile body in combination with the frame work of the lower section including a frame member adjacent the cowl forming part of a door jamb, a metallic top supporting post rising therefrom comprising a transverse web extending below the belt line and secured to said member, a part projecting forwardly therefrom and overlying said frame member to receive an underriding support therefrom and a forwardly extending reinforcing flange merging into said part and defining with said web a rabbet to receive the windshield.

10. In a closed automobile body in combination with the frame work of the lower section including a frame member adjacent the cowl forming part of a door jamb, a metallic top supporting post rising therefrom comprising a transverse web extending below the belt line and secured to said member, a part projecting forwardly therefrom and overlying said frame member to receive an underriding support therefrom and a forwardly extending reinforcing flange merging into said part and defining with said web a rabbet to receive the windshield, and a rib tying together said part and the main portion of said web.

11. In a closed automobile body an upright front corner post, a door having cross frame members and a hinge pillar adjacent said post, the upper portion of the door adjacent said post forming a window frame receiving a sliding glass panel, the portion of the pillar opposing said post comprising a body of extreme thinness in the plane of the window and providing a guideway to receive the glass, and hinges hanging the door comprising hinges below the belt and a detachable hinge at the upper part of the door aligned with the upper cross frame member thereof whereby the same is disposed beyond said guideway and the latter may be organized in closely spaced relation to said post to provide an assembly of small depth.

12. A closed vehicle having a lower body frame including a component element thereof extending from sill to belt to provide a portion of a hinge pillar, said pillar also including a metallic top-supporting post lapping on said element and secured thereto, and a door hung on said pillar by means including a hinge leaf overlying a part of said post to confine it against said element and secured to said frame.

13. A closed vehicle having a lower body frame including a component element thereof extending from sill to belt to provide a portion of a hinge pillar, said pillar also including a metallic top-supporting post lapping on said element and secured thereto, and a door hung on said pillar by means including a hinge leaf overlying a part of said post and fastened thereto, said leaf being secured and firmly anchored in said frame independently of its attachment to the post.

14. A closed vehicle of the composite type having a lower body frame including a component element thereof extending from sill to belt to provide a portion of a hinge pillar, said pillar also including a metallic top-supporting post having a lower portion fitted against and secured to said element, and having also a part adjacent said portion relatively offset therefrom and mortised into said element to provide an interlocking joint therewith, and a door hung from said pillar by means including a hinge leaf secured to said offset portion and received thereby substantially flush with said lower portion of said post.

15. A closed vehicle of the composite type having a lower body frame including a component element thereof extending from sill to belt to provide a portion of a hinge pillar, said pillar also including a metallic top-supporting post having a lower portion fitted against and secured to said element, and having also a part adjacent said portion relatively offset therefrom and a door hung from said pillar by means including a hinge leaf received against said part and secured to said post to cooperate with a wall of the offset to maintain said post and leaf in fixed angular relation, said leaf being anchored in the frame of the body independently of said post.

16. A closed vehicle having a body frame including a hinge pillar for a door which also provides a support for the roof and a door hung at said pillar by means including a hinge having a leaf interlockingly secured to an element of said frame to maintain the angular relation of said element and leaf and additionally anchored to another element of the frame to serve as a fish plate for the framework.

In testimony whereof I hereto affix my signature.

ALEXANDER CARLSON.